Aug. 2, 1955  A. C. SCAVULLO  2,714,296
THERMALLY INSULATED CONTAINER
Filed Dec. 18, 1950
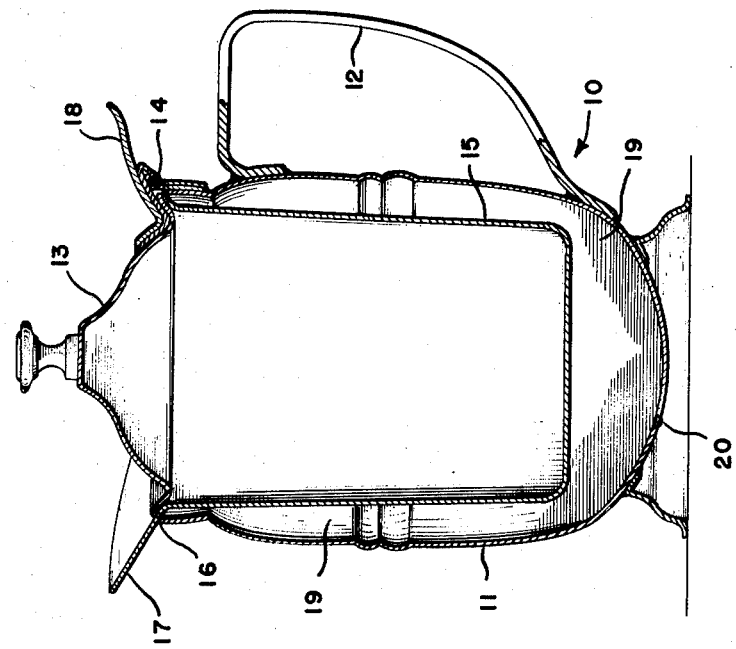
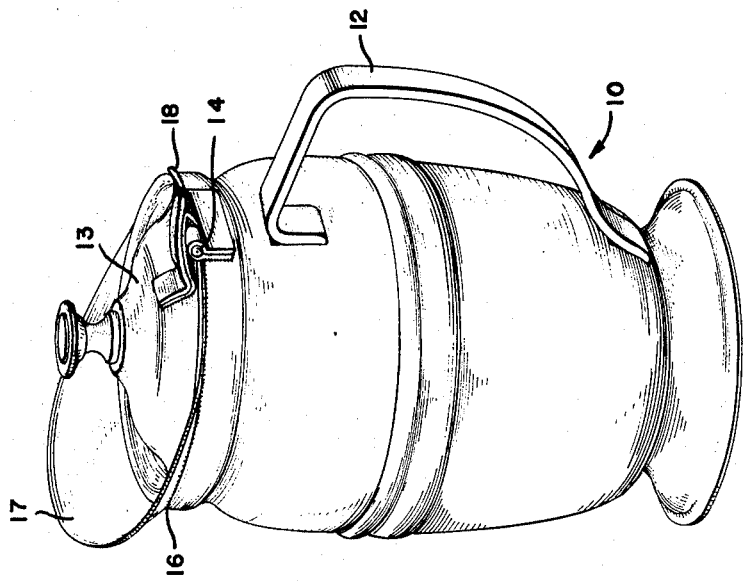
INVENTOR
ANGELO C. SCAVULLO
BY
HIS ATTORNEY United States Patent Office 2,714,296
Patented Aug. 2, 1955

2,714,296

THERMALLY INSULATED CONTAINER

Angelo C. Scavullo, Forest Hills, N. Y., assignor to Victor K. Scavullo, Frank Scavullo, Charles Scavullo, Marie Scavullo Saegert, and Margaret Scavullo Scott Application December 18, 1950, Serial No. 201,379

2 Claims. (Cl. 65—66)

My invention relates generally to a vessel for the storage of foods, liquids and the like with minimum temperature change, and is directed more particularly to a new form of thermally insulated container and a method of making the same.

Among the objects of my invention is the provision in simple direct manner of a new thermally insulated container of the general type described which is characterized by its simplicity of construction, its low cost, its ease and rapidity of manufacture, its sturdiness and its long, useful life, and as well, by its highly advantageous thermal insulating qualities, retaining the contents thereof over long periods of time with minimum change in temperature.

Other objects and advantages in part will be obvious, and in part pointed out hereinafter during the course of the following description, taken in the light of the accompanying drawing.

Accordingly, my invention may be seen to reside in the arrangement of parts, in the several features and details of construction and combinations thereof, and in the several operational steps and the relation of each of the same to one or more of the others, the scope of the application of all of which is more fully set forth in the claims at the end of this specification.

In the drawings, wherein I have disclosed one typical embodiment of my invention which I prefer at present, Figure 1 is a perspective view disclosing a thermally insulated container according to the practice of my invention; while Figure 2 is a sectional view taken vertically along line 2—2 through the container according to Figure 1.

In the several views of the drawing like reference characters denote like constructional parts.

As conducive to a more thorough understanding of my invention, it may be noted at this point that while attention has long been given to the production of thermally insulated storage jars, pots, crockery and the like, nevertheless many practical problems and difficulties still remain concerning simplifying and making more rapid the production thereof, while reducing the attendant cost, at the same time improving the thermal insulating qualities with increase in sturdiness and diminishing breakage.

It will be recalled that heretofore the usual container displaying high thermal insulating efficiency employs a blown, double-walled, hollow glass vessel or the like, thoroughly evacuated in the space between the walls thereof to provide a high degree of vacuum therein. This thin-walled glass product inherently is fragile and is readily susceptible to breakage. Particularly is this true in its evacuated condition, where any blow is likely to produce collapse internally of the evacuated space. Purely as a protection, and in no wise contributing appreciably to the thermal insulating effect, is an outer jacket or shell. We think of this jacket or shell, usually cylindrical in form, when reference is made to a thermally insulated jug. It will be noted, however, that the functional part of the jug is the inner glass container.

Some effort has been made to improve the permanence and to reduce the high degree of breakage of thermally insulated jugs, at the same time reducing the complexity of construction, by employing pottery or other vitreous composition as the insulating filler between two elements, typically metal, separated thereby. In some instances, the inner one of the two cooperating members is dispensed with, and the pottery or other vitreous container, manufactured or tempered so as to be resistant against breakage, itself serves as the holder for the liquid foodstuff or the contents of the jug. This thermally insulated container, while possessing some of the advantages for which it is designed, displays the inherent detriment of low thermal insulating efficiency. The contents quickly lose their initial temperature of storage and assume the prevailing room temperature.

Efforts have been made to reconcile the two factors of required high thermal insulating efficiency on the one hand, with long useful life on the other hand, through constructing a thermally insulated container consisting of two cooperating hollow elements, both formed of a material which is rugged and highly resistant to mechanical failure through dropping, or other tendency towards breakage. Illustratively, spaced, concentric metal shells have been employed. To date however, despite the recognized high degree of activity in this art, no one has brought forth a thermally insulated container wherein two cooperating and complemental vessels of metal or other like substance are joined together and display high physical strength properties and resistance against breakage, and at the same time, and in joined and finished condition, display the required high degree of thermal efficiency.

Accordingly, an important object of my invention is to provide a thermally insulated container of the general type described which, avoiding in substantial measure the defects and disadvantages of the prior art as hereinbefore recited, is substantially unbreakable, is simple of production; which has long useful life, which can be readily and nicely finished to pleasing specifications; and which at the same time displays high thermal insulating efficiency throughout its useful life so that the contents thereof depart only sluggishly from their temperature of introduction.

Before giving a detailed description of the constructional features of the improved thermally insulated container of my invention, it may be helpful by way of introduction to note that essentially, I take two sheets of stainless steel of a desired thickness, say approximately 0.05 inch, and individually deep draw the same so as to produce two cylindrical vessels of different depths and diameters. Illustratively a three-quarter inch difference advantageously exists between the diameters. I then telescope the two vessels, thus drawn and shaped, within each other, with the open mouths uppermost and juxtaposed. I then turn the lips of the two vessels over upon each other in desired manner and secure the same together, preferably by brazing.

I thus produce a unitary, shaped thermally insulated jug or bottle for which there remains only the step of imparting thereto the required high thermal insulating properties. This I readily achieve by evacuating the space between the two vessels in desired suitable manner, as by drilling, punching or otherwise providing a hole through the bottom of the outer container, applying a vacuum pump thereto and drawing a required vacuum. I then seal off the hole as by brazing, soldering or the like, after the required and calibrated high degree of vacuum has been had.

And now, having reference more particularly to the several views of the drawing, it will be noted that the thermal container, indicated generally at 10, comprises an outer hollow shell or body portion 11, a handle 12 applied thereto, and a cover member or lid 13 illustrated as hinged thereto at 14. As is apparent from Figure 2, I provide an inner hollow shell 15 received within the outer shell 11 and joined thereto with the annular seal 16 adjacent the mouth thereof.

In the prefererd embodiment of my invention, I provide the shells 11 and 15 each of a single flat sheet of stainless steel, especially 18-8 chromium-nickel stainless steel of extra-low carbon quality, that is, carbon not exceeding about 0.03%. I shape these flat metal sheets into desired configuration by drastically deep-drawing the same to the point where the depth substantially exceeds the diameter, this to the extent of two or three-fold. With this steel I find that intermediate annealing may be dispensed with. The flat sheets of metal are readily and rapidly brought to the generally-required configuration, with ready flow of the metal and without undue local strain at points within the metal.

I prefer to use as a material from which to fabricate the shells, stainless steel of extra-low carbon quality for the reasons, amongst others, of its ease of working, with minimum tendency to work-harden. However, it is of course feasible, with some sacrifice of desired good results, to employ other grades of stainless steel, since they appear to be comparatively poor conductors of heat, or other known and available materials displaying qualities of ready workability, low cost and high strength properties, so as to combine the two factors of ease and economy of production on the one hand, and long useful life on the other hand.

The open edges of the two shells are then finished off in suitable maner to final configuration, both from the standpoint of dimensions and ornamentation.

The two substantially complementary, generally tubular shells 11 and 15 are now telescoped one within the other. Typically shell 15 will have an external diameter approximately ¾ of an inch less than that of vessel 11. I secure together the shells 11 and 15, in their telescoped positions, and with their outer lips in registry, in suitable manner, as by brazing. Usually I provide on a selected one of the inner or outer shells 11 or 15 a lip 17 in suitable manner, as by flanging or spinning. Preferably, and as I show in the preferred embodiment, I form this lip on the inner shell 15. In conventional manner, it facilitates pouring.

Applied along the side of outer shell 11 thereof, I provide a handle 12. This handle, of course, may have any desired configuration, its design from an aesthetic standpoint preferably being consistent with that of the outer shell 11. It may be formed of any suitable material, but for the sake of simplicity it generally is of the same material as the formed shell 11. Thus, typically, handle 12 is formed of a single piece of stainless steel, and is welded, soldered, riveted or otherwise applied to the sidewalls of shell 11.

Considering now the matter of a closure element, I provide a sturdy hinged bracket member 14 preferably formed of a folded element of stainless steel, applied to the upper lip of the outer shell 11 in line with and above the handle 12 and secured to shell 11 in any desired suitable manner, as by welding, soldering or riveting. In the present embodiment I resort to welding to join these two elements. The upper, free edge of the hinge bracket 14, at the fold thereof, is centrally cut away to provide two exteriorly disposed bosses which are shaped to provide a central bore or bearing surface for the hinge pintle. The pintle itself, constituting a cylindrical pin or rod, extends through these bosses and is provided with upset ends, so as to be firmly and rotatably carried in position.

I provide a cover element shown generally at 13 preferably fashioned of stainless steel and struck from a single sheet of that metal. I resort to this construction for the purpose of excellence of finish and desired insulation properties. I provide a combined hinge part and thumb pad 18 for the cover 13 conveniently formed from a single strip of flat stainless steel ribbon and shaped to desired contour. For this purpose I preferably employ a folded strip of flat stainless steel ribbon brazed, welded or soldered to the cover 13. And I spread the folded part of the thumb piece in the manner of a yoke to provide a journal fitting over the hinge pintle heretofore described. In this manner I provide a simple hinge, pleasing in appearance, sturdy in use and readily manufactured at a minimum of cost.

I impart desired high thermal insulating efficiency to the thermally insulated container by creating a high vacuum in the hollow space 19 between the two shells 11 and 15. This I accomplish by drilling a small aperture 20 at the bottom of the outer shell 11, and applying a vacuum pump thereto. I seal off this aperture 20 by welding or soldering when, through the use of suitable gauges, the high degree of vacuum maintains within the vacuum jug.

Through my new construction there has been produced a thermally insulated container of high thermal insulating efficiency and which is rugged, strong and durable. Moreover, the resulting product may have pleasing ornametation, readily applied, not heretofore available; may be readily produced in a variety of functional and ornamental shapes and configurations; and possesses substantially unlimited life with marked immunity against damage or breakage. All these, as well as many other highly practical and important advantages, attend upon the practice of my invention.

I do not intend to be restricted by the foregoing specification, which has been merely illustrative, but rather, desire to be limited only by the scope of the following claims. This is because many embodiments of the present invention will readily suggest themselves to those skilled in the art, once the basic disclosure has been made.

I claim as my invention:

1. A wide-mouth thermally insulated container comprising two interfitting cylindrical deep-drawn stainless steel sheet metal receptacles open at one end and closed at the other, the outer receptacle being substantially larger in diameter than the inner one and terminating in an upper edge, the inner receptacle having straight side walls and an outwardly flared mouth portion integral therewith, said mouth portion terminating at one side in a pouring lip, said side walls and said mouth portion being connected by a continuous smooth and gently curved surface between receptacle wall and lip, said flared mouth portion providing a continuous surface overlying said edge of said outer receptacle and on its underside contacting said edge throughout its extent in abutting relation and being brazed thereto, the two receptacles being spaced from each other adjacent said edge and along their lengths and at their bottom portions, the space between said receptacles being evacuated.

2. A wide-mouth thermally insulated container according to claim 1 having hinged thereto a stainless steel sheet metal closure member for said container generally dome-shaped and having a reversely curved and upwardly flared rim, which rim fits upon and conforms to the flared mouth portion of the inner receptacle and making extensive surface contact therewith to effect closure of the container.

References Cited in the file of this patent

UNITED STATES PATENTS

| 19,855 | Kauffman | Apr. 6, 1858 |
| 222,444 | Berry | Dec. 9, 1879 |
| 227,137 | Taylor | May 4, 1880 |
| 380,137 | Rieffel | Mar. 27, 1888 |
| 795,930 | Perkins | Aug. 1, 1905 |

(Other references on following page)

UNITED STATES PATENTS

| | | |
|---|---|---|
| 850,143 | Donnelly | Apr. 16, 1907 |
| 924,922 | Neely et al. | June 15, 1909 |
| 999,672 | Puffer | Aug. 1, 1911 |
| 1,093,648 | Potter | Apr. 21, 1914 |
| 1,165,952 | Dunlap | Dec. 28, 1915 |
| 1,181,162 | Pierce | May 2, 1916 |
| 1,353,305 | Altenberg | Sept. 21, 1920 |
| 1,497,159 | Porter | June 10, 1924 |
| 1,513,264 | Oels | Oct. 28, 1924 |
| 1,652,552 | Allen | Dec. 13, 1927 |
| 1,760,321 | Seigheim | May 27, 1930 |
| 1,960,000 | Chesney | May 22, 1934 |
| 2,144,820 | Thomas | Jan. 24, 1939 |
| 2,313,161 | Merolle | Mar. 9, 1943 |
| 2,510,671 | Verheyden | June 6, 1950 |
| 2,519,862 | Verheyden et al. | Aug. 22, 1950 |
| 2,542,987 | Brock | Feb. 27, 1951 |